United States Patent
Grebe et al.

(10) Patent No.: US 9,909,675 B2
(45) Date of Patent: Mar. 6, 2018

(54) CHECK VALVE FOR VENTILATION OR OUTLET OPENINGS OF COMPRESSED AIR APPARATUSES IN VEHICLES

(71) Applicant: Knorr-Bremse Systeme Fuer Nutzfahrzeuge GmbH, Munich (DE)

(72) Inventors: Jan Grebe, Munich (DE); Thomas Bemetz, Munich (DE); Laszlo Menyhart, Gyal (HU); Gabor Fojtyik, Szigetszentmiklos (HU)

(73) Assignee: KNORR-BREMSE SYSTEME FUER NUTZFAHRZEUGE GmbH, Munich (DE)

( * ) Notice: Subject to any disclaimer, the term of this patent is extended or adjusted under 35 U.S.C. 154(b) by 102 days.

(21) Appl. No.: 14/763,130

(22) PCT Filed: Jan. 24, 2014

(86) PCT No.: PCT/EP2014/051405
§ 371 (c)(1),
(2) Date: Jul. 23, 2015

(87) PCT Pub. No.: WO2014/114750
PCT Pub. Date: Jul. 31, 2014

(65) Prior Publication Data
US 2015/0369383 A1    Dec. 24, 2015

(30) Foreign Application Priority Data
Jan. 25, 2013  (DE) .................... 10 2013 100 778

(51) Int. Cl.
*F16K 15/14*  (2006.01)
*B60T 17/04*  (2006.01)
(Continued)

(52) U.S. Cl.
CPC ............. *F16K 15/144* (2013.01); *B60T 13/26* (2013.01); *B60T 17/04* (2013.01); *F16K 24/04* (2013.01);
(Continued)

(58) Field of Classification Search
CPC .......... B60T 13/26; B60T 17/04; F16K 24/04; F16K 31/126; F16K 15/144; F16K 15/145; Y10T 137/7904
(Continued)

(56) References Cited

U.S. PATENT DOCUMENTS 4,146,275 A   3/1979  Elliott et al.
4,461,313 A   7/1984  Beaumont
(Continued)

FOREIGN PATENT DOCUMENTS

CN    2093284     1/1992
DE    19 38 206   2/1971
(Continued)

OTHER PUBLICATIONS

International Search Report for PCT/EP2014/051405, dated Jan. 24, 2014.
(Continued)

*Primary Examiner* — Craig Schneider
*Assistant Examiner* — P. Macade Nichols
(74) *Attorney, Agent, or Firm* — Andrews Kurth Kenyon LLP

(57) ABSTRACT

A ventilation or check valve for ventilation or outlet openings of compressed air apparatuses of vehicles, includes at least one diaphragm disk which is made from flexible material, is held with a central region in a bore of a valve housing and is prestressed with a radially outer region against a valve seat on the valve housing, to lift up from the valve seat in a pressure-induced manner in the case of a
(Continued)

pressure gradient between an inlet space and an outlet space or atmosphere and to open a flow cross section between the inlet space and the outlet space or atmosphere, in which, as viewed in the circumferential direction of the diaphragm disk, a plurality of hold-downs which are arranged at a circumferential spacing from one another and hold down the radially outer region of the diaphragm disk locally against the valve seat are provided on the valve housing.

14 Claims, 1 Drawing Sheet

(51) Int. Cl.
*F16K 24/04* (2006.01)
*B60T 13/26* (2006.01)
*F16K 31/126* (2006.01)

(52) U.S. Cl.
CPC ....... *F16K 31/126* (2013.01); *Y10T 137/7904* (2015.04)

(58) Field of Classification Search
USPC .................................................. 137/843–860

See application file for complete search history.

(56) References Cited

U.S. PATENT DOCUMENTS

| | | | |
|---|---|---|---|
| 4,733,919 A | 3/1988 | Jacobs et al. | |
| 2008/0053546 A1* | 3/2008 | Briggs | B60K 15/077 137/854 |

FOREIGN PATENT DOCUMENTS

| | | |
|---|---|---|
| DE | 34 44 865 | 6/1986 |
| DE | 196 30 261 | 1/1998 |
| DE | 199 18 070 | 12/1999 |
| DE | 10 2008 028439 | 10/2009 |
| DE | 10 2009 030898 | 12/2010 |
| EP | 0 474 437 | 3/1992 |
| GB | 2 075 640 | 11/1981 |
| GB | 2 429 261 | 2/2007 |
| WO | WO 2007/102935 | 9/2007 |

OTHER PUBLICATIONS

Office Action dated Oct. 8, 2016, in corresponding Chinese Patent Application No. 201480012897.X.
European Patent Office, International Preliminary Report on Patentability dated Jul. 28, 2015, from International Patent Application No. PCT/EP2014/051405, filed on Jan. 24, 2014.
English Translation of European Patent Office, International Preliminary Report on Patentability dated Jul. 28, 2015, from International Patent Application No. PCT/EP2014/051405, filed on Jan. 24, 2014.

* cited by examiner

CHECK VALVE FOR VENTILATION OR OUTLET OPENINGS OF COMPRESSED AIR APPARATUSES IN VEHICLES

FIELD OF THE INVENTION

The present invention relates to a ventilation or check valve for ventilation or outlet openings of compressed air apparatuses of vehicles, comprising at least one diaphragm disk which is made from flexible material, is held with a central region in a bore of a valve housing and is prestressed with a radially outer region against a valve seat on the valve housing, in order to lift up from the valve seat in a pressure-induced manner in the case of a pressure gradient between an inlet space and an outlet space or atmosphere and to open a flow cross section between the inlet space and the outlet space or atmosphere.

BACKGROUND INFORMATION

A ventilation or check valve of this type is discussed in DE 19 38 206 A which forms the generic type, and is, for example, a constituent part of an electropneumatic ABS pressure control valve according to DE 197 01 200 C2 from the applicant of the present patent application. According to the embodiment which is shown there in FIG. 5, the ventilation or check valve is arranged in a lower ventilation opening of the housing of the ABS pressure control valve which serves to hold or lower the brake pressure of a slip-controlled pneumatic brake system of a vehicle in a manner which is dependent on brake slip. In order to lower the pressure in the case of excessive brake slip which is detected by an ABS electronic system, a control valve of the ABS pressure control valve is excited, as a result of which compressed air passes out of the brake line via the interior of the ABS pressure control valve into the ventilation opening and into the ventilation or check valve, the diaphragm lifting up from the valve seat as a result of the pressure gradient and it being possible for the compressed air to pass to atmosphere.

Furthermore, DE 10 2007 054 760 B3 discusses a ventilation or check valve of this type which is arranged there in a ventilation opening of a pressure relief valve of a compressed air brake system of a rail vehicle, in order to limit excessive pressure in a main air line to a predefined value during a filling stroke by virtue of the fact that excessive compressed air flows away via the ventilation opening and the ventilation or check valve arranged therein.

Patent document WO 96/21589 A1 refers to an application, in which a ventilation or check valve is arranged in a wall of a spring chamber of a spring accumulator brake cylinder, which spring chamber accommodates an accumulator spring, in order to ventilate the spring chamber in the case of a reduction in volume of said spring chamber brought about by release of the spring accumulator brake.

A common feature of all of said applications of a ventilation or check valve is that they are intended to permit the flow of a medium, for example of compressed air, only in one direction and to prevent it in the opposite direction. For the abovementioned applications, this means, for example, that the ventilation or check valve is intended to permit the flow of compressed air only from the interior of the relevant compressed air device to atmosphere, but is intended to prevent a flow in the opposite direction.

In addition to this basic function, ventilation or check valves which are used in the field of automotive technology and are configured as diaphragm valves of the generic type are intended to ensure a high air throughput, low throttling effects during the outflow, reliable blocking of the undesired flow direction, reliable prevention of the penetration of dirt, a low opening or response pressure and, above all, low noise development.

The latter has proven difficult, however, since high noise development is to be observed, above all, in the case of relatively compliant material of the diaphragm because the compliant diaphragm can then be excited more readily by the air flow to perform oscillations (solid-borne sound) which cause corresponding air-borne sound. If, in contrast, the rigidity of the material of the diaphragm is relatively high, the seal properties with respect to the valve seat tend to be moderate.

SUMMARY OF THE INVENTION

Proceeding herefrom, it is an object of the invention to develop a ventilation or check valve of the type mentioned at the outset, in such a way that it ensures both low noise development and satisfactory seal properties.

This object may be achieved by way of the features as described herein.

According to the invention, as viewed in the circumferential direction of the diaphragm disk, a plurality of hold-downs which are arranged at a circumferential spacing from one another and hold down the radially outer region of the diaphragm disk locally against the valve seat are provided on the valve housing.

The radially outer region of the diaphragm disk or its radially outer edge can then no longer lift up completely from the valve seat, but rather, as viewed in the circumferential direction, only the circumferential sections of the radially outer region of the diaphragm disk which are arranged between the hold-downs. The hold-downs which locally prevent or restrict lifting up of the diaphragm disk from the valve seat ensure an increase in the clamping rigidity of the diaphragm on the valve housing and prevent the diaphragm from being able to oscillate over a large area as a result of the flow. Since in this way only relatively small diaphragm areas can still oscillate freely, and then only with a reduced oscillation amplitude, the area of the diaphragm disk which potentially emits air-borne sound drops, which overall results in a lower tendency to produce air-borne sound.

Moreover, the applicant was able to determine using tests that, in addition to low noise development, ventilation or check valves which are configured according to the invention also have a high air throughput, low throttling effects during the outflow, reliable blocking of the undesired flow direction, reliable prevention of the penetration of dirt, and a low opening pressure.

A plurality of hold-downs of this type may be provided on the valve housing at an approximately identical circumferential spacing, as viewed in the circumferential direction. In particular, the hold-downs press the radially outer region of the diaphragm disk locally against the valve seat. As an alternative, however, hold-downs can exert such hold-down forces on the radially outer region of the diaphragm disk that said radially outer region just still makes contact with the valve seat or even lifts up slightly from the latter in the case of a presence of a correspondingly great pressure gradient in the opening direction.

In the installed state of the ventilation or check valve according to the invention in a ventilation or outlet opening of a compressed air apparatus of a vehicle, the valve housing of the ventilation or check valve can be integrated at least partially into a housing of the compressed air apparatus of a vehicle and, in particular, can be configured in one piece with said housing. The bore of the valve housing which is closed by the diaphragm which interacts with the valve seat then forms a section of the ventilation or outlet opening of the compressed air apparatus, the inlet space then being formed by the ventilation or outlet opening of the compressed air apparatus and the outlet space being formed by atmosphere. In this case, the ventilation or check valve according to the invention permits a flow from the ventilation or outlet opening of the compressed air apparatus to atmosphere, but prevents a return flow.

As an alternative, the ventilation or check valve according to the invention can also be configured as a separate module which is then installed on the compressed air apparatus in a corresponding receptacle such as a ventilation or outlet opening. Last but not least, the ventilation or check valve according to the invention can also be installed in a pressure line of the compressed air apparatus, however.

Advantageous developments and improvements of the invention specified herein are possible by way of the measures described in the further descriptions herein.

The hold-downs may particularly be arranged on a cover of the valve housing, which cover covers the bore of the valve housing with the at least one diaphragm disk. As a result of a suitable configuration of the cover, said cover can help to protect the diaphragm against damage from the outside and to prevent the penetration of dirt. Furthermore, the hold-downs can, in particular, be configured in one piece with the cover, which brings about simple production and assembly of the ventilation or check valve according to the invention.

According to one development, as viewed in the circumferential direction of the cover which has, for example, an arcuate connecting part to the valve housing, ventilation openings are provided in the cover at the circumferential positions of the hold-downs.

In order to shield the diaphragm disk and the valve seat in the region of said ventilation openings on the cover against environmental and flow influences, as viewed in the radial direction of the cover, wall sections of arcuate cross section of the cover are arranged between the ventilation openings and the hold-downs, which wall sections, as viewed in the circumferential direction of the cover, are arranged at the positions of the hold-downs and extend axially away from the cover in relation to a center axis of the cover.

Said wall sections may also be configured in one piece with the cover.

In order to ensure particularly comprehensive protection of the diaphragm disk and the valve seat, the wall sections of the cover particularly may protrude beyond the valve seat as viewed in a direction parallel to the center axis of the cover. For this purpose, the arc length of the arcuate wall sections is greater than the circumferential extent of the ventilation openings.

In the case of a pressure difference which exceeds the opening pressure, in order to permit flow from the inlet space through the flow cross sections which are opened by the circumferential sections of the diaphragm disk which are raised up from the valve seat owing to the pressure and are not held down on the valve seat by the hold-downs into the ventilation openings on the cover, as viewed in the circumferential direction of the cover, flow openings are arranged between the arcuate wall sections, which flow openings open into a radially outer annular duct of the cover, which annular duct communicates with the ventilation openings.

As a consequence, the compressed air flow which flows through the free flow cross sections between the valve seat and the diaphragm disk is guided around the hold-downs and the wall sections as viewed in the radial direction, in order to open into the annular flow duct in the cover, through which flow duct it can then pass into the ventilation openings in the cover.

The diaphragm disk may be held on a journal which is held centrally in the bore of the valve housing. In order to center the cover on the valve housing, said journal protrudes, for example, into a bore of the cover.

Mandrel-shaped stops for the diaphragm disk may be configured on the end faces of the hold-downs which face the diaphragm disk. By way of said mandrel-shaped stops, the diaphragm disk which is manufactured from flexible and compliant material can be fixed against the valve seat in a particularly satisfactory manner. Said mandrel-shaped stops have a diameter, for example, of 1 mm.

The valve seat particularly may be configured as a narrow circumferential sealing blade on a bore edge of the bore, the sealing blade being aligned radially with the mandrel-shaped stops.

As has already been described above, according to one application, the ventilation or check valve according to the invention is arranged in a ventilation or outlet opening of a compressed air apparatus of the vehicle. In particular, the compressed air apparatus can comprise at least one electropneumatic or pneumatic valve with at least one ventilation opening, in which a ventilation or check valve according to the invention is then arranged. The electropneumatic valve is, for example, an ABS valve or an ASR valve of a brake slip-controlled and/or drive slip-controlled pneumatic or electropneumatic brake system of the vehicle, as described, for example, in DE 197 01 200 C2 which is mentioned above.

The compressed air apparatus of the vehicle might likewise comprise at least one spring accumulator brake cylinder of a pneumatic or electropneumatic brake system of the vehicle, for example in accordance with WO 96/21589 A1 which is mentioned above, it being possible for a ventilation or check valve according to the invention to be arranged in at least one ventilation opening of a wall of the spring chamber of the spring accumulator brake cylinder, which spring chamber accommodates an accumulator spring.

Further measures which improve the invention will be described in greater detail in the following text, in the description of exemplary embodiments of the invention and in the drawing.

In the following, one exemplary embodiment of the invention is shown in the drawings and is explained in greater detail in the following description.

DETAILED DESCRIPTION

Figure 1:
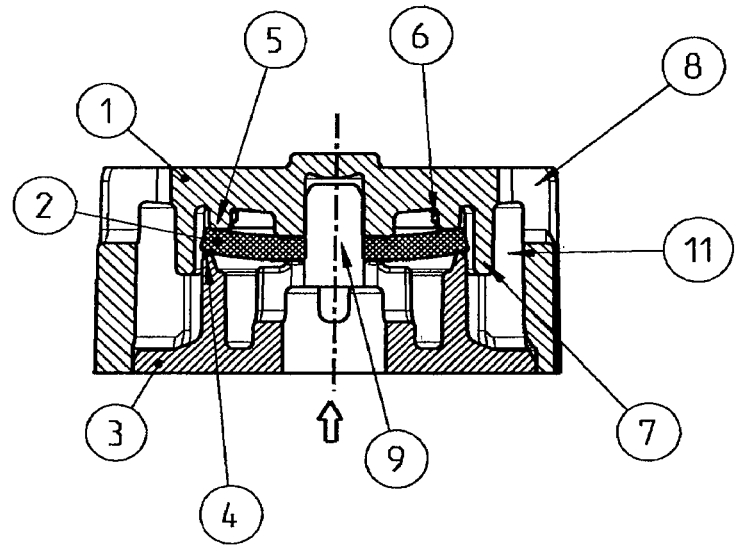
FIG. 1 shows a cross-sectional illustration of a ventilation or check valve according to the invention in accordance with one embodiment of the invention.

The ventilation or check valve which is shown in cross section in FIG. 1 is integrated, for example, into an outlet ventilation opening of a compressed air duct of an ABS pressure control valve (ABS valve) or a traction control valve (ASR valve) (not shown here for reasons of scale) of a pneumatic or electropneumatic brake system of a commercial vehicle. The ventilation or check valve then serves to make a flow possible (symbolized by the arrow in FIG. 1) from the compressed air duct, which opens via the outlet or ventilation opening to atmosphere, to atmosphere, but to prevent a flow in the opposite direction.

The ventilation or check valve is a diaphragm valve and opens as soon as a pressure difference between the compressed air duct and atmosphere has reached or exceeded the opening pressure of the ventilation or check valve. This is the case in the application described here, for example, if the electromagnetic outlet valve of the ABS valve or the ASR valve is opened to lower the brake pressure and compressed air then flows out from the brake line via the open outlet valve of the ABS valve into the compressed air duct and into its outlet or ventilation openings and from there via the ventilation or check valve according to the invention to atmosphere.

The ventilation or check valve comprises a diaphragm disk 2 which is made from flexible material, for example from an elastomer, is held with the central region in the outlet or ventilation opening and is prestressed with a radially outer region against the valve seat 4 on the valve housing 3. The valve seat 4 particularly may be configured as a circumferential sealing blade at the edge of the outlet or ventilation opening of the pressure control valve. Here, the valve housing 3 then exists, for example, in the wall of the compressed air duct in the region of the outlet or ventilation opening of the pressure control valve, with which it may be configured in one piece.

In the case of a pressure gradient between the pressure in the compressed air duct of the pressure control valve and atmospheric pressure, which pressure gradient reaches or exceeds the opening pressure of the ventilation or check valve, the radially outer region of the diaphragm disk 2 lifts up from the valve seat 4 and then opens a flow cross section between the compressed air duct and atmosphere.

The diaphragm disk may be held with its central region on a journal 9 which is arranged centrally in the outlet or ventilation opening of the pressure control valve. The valve seat 4 may be configured as a circumferential sealing blade at an edge of the outlet or ventilation opening of the pressure control valve.

As viewed in the circumferential direction of the diaphragm disk 2, a plurality of hold-downs 6 which are arranged at a circumferential spacing from one another are provided, for example four hold-downs 6 on the two orthogonal axes of a cover 1, which hold-downs 6 hold down the radially outer region of the diaphragm disk 2 locally against the valve seat 4, as is readily conceivable using FIG. 1.

Mandrel-shaped stops 5 for the diaphragm disk 2 may be configured on an end face of the hold-downs 6 which faces the diaphragm disk 2. By way of said mandrel-shaped stops 5, the diaphragm disk 2 which is manufactured from flexible and compliant material can be fixed against the valve seat 4 in a particularly satisfactory manner. The mandrel-shaped stops 5 have, for example, a diameter of only 1 mm.

Figure 2:
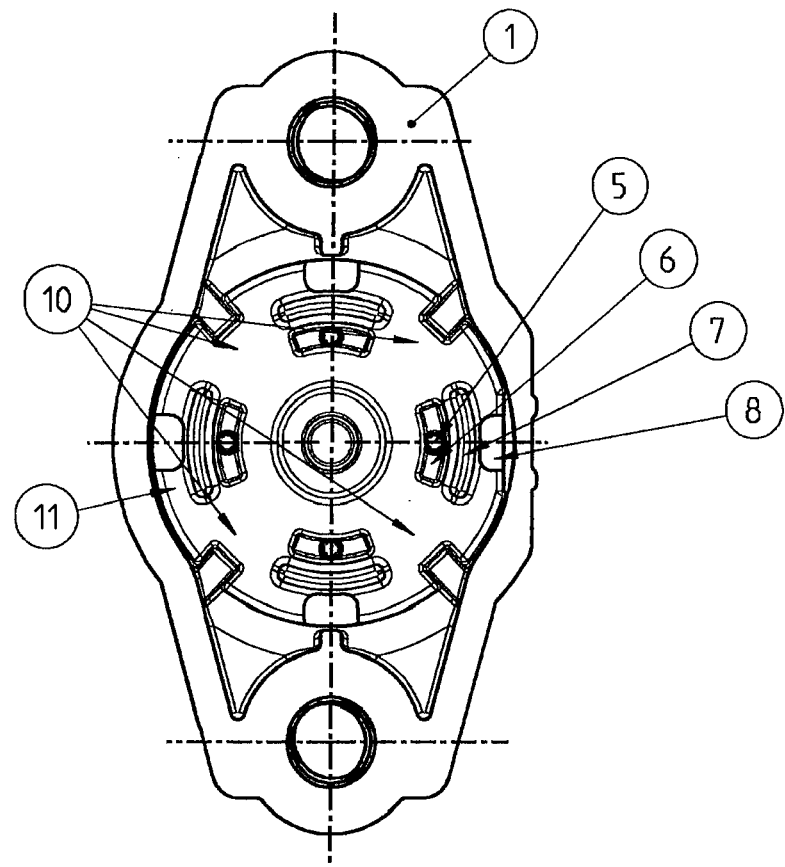
FIG. 2 shows a view from below of a cover of the ventilation or check valve from FIG. 1.

The hold-downs 6 particularly may be arranged on the cover 1 which covers the outlet or ventilation opening of the pressure control valve with the diaphragm disk 2. The hold-downs 6 are configured, in particular, in one piece with the cover 1. In order to center the cover 1, the journal 9 which secures the diaphragm disk 2 protrudes, for example, into a central bore of the cover 1. The cover 1 can then be fastened to the edge of the outlet or ventilation opening of the pressure control valve, for example, by screws which are fixed on screw eyes of the cover 1, as is apparent from FIG. 2, in particular.

As viewed in the circumferential direction of the cover 1 which has, for example, a circular connecting part (FIG. 2) to the valve housing 3 or here to the edge of the outlet or ventilation opening of the pressure control valve, ventilation openings 8 are provided in the cover 1 at the circumferential positions of the hold-downs 6. In other words, the hold-downs 6 and the ventilation openings 8 are arranged so as to be aligned radially with respect to one another.

In order to shield the diaphragm disk 2 and the valve seat 4 in the region of the ventilation openings 8 in the cover 1 against environmental and flow influences, wall sections 7 of the cover 1 which are arcuate in cross section are arranged between the ventilation openings 8 and the hold-downs 6 as viewed in the radial direction of the cover 1, which wall section 7, as viewed in the circumferential direction of the cover 1, are arranged at the position of the hold-downs 7 and extend axially away from the cover 1 in relation to a center axis of the cover 1, perpendicularly with respect to the cover plane. In other words, the hold-downs 6, the wall sections 7 and the ventilation openings 8 are then arranged so as to be aligned radially with respect to one another. The wall sections 7 may also be configured in one piece with the cover 1.

The wall sections 7 of the cover 1 may protrude beyond the valve seat 4 as viewed in a direction parallel to the center axis of the cover 1. Furthermore, the arc length of the arcuate wall sections 7 is, for example, greater than the circumferential extent of the ventilation openings 8.

In the case of a pressure difference which exceeds the opening pressure, in order to permit a flow from the compressed air duct of the ABS valve or of the ASR valve through the flow cross sections, which are opened by the circumferential sections of the diaphragm disk 2 which are raised up from the valve seat 4 in a pressure-induced manner and are not held down on the valve seat 4 by the hold-downs 6, into the ventilation openings 8 in the cover 1, flow openings 10 are arranged between the arcuate wall sections 7 as viewed in the circumferential direction of the cover 1, which flow openings 10 open into a radially outer annular duct 11 of the cover 1, which annular duct 11 communicates with the ventilation openings 8. As a consequence, the flow of compressed air which flows through the free flow cross sections between the valve seat 4 and the diaphragm disk 2 is guided around the hold-downs 6 and the wall sections 7 as viewed in the radial direction, in order to open into the annular flow duct 11 in the cover 1, through which flow duct 11 it can then pass into the ventilation openings 8 in the cover 1, as is readily conceivable using FIG. 2.

The list of designations is as follows:

1 Cover
2 Diaphragm disk
3 Valve housing
4 Valve seat
5 Stops
6 Hold-downs
7 Wall sections
8 Ventilation openings
9 Journal
10 Flow opening
11 Annular flow duct

The invention claimed is:

1. A ventilation/check valve for a ventilation or outlet opening of a compressed air apparatus of a vehicle, comprising:

at least one diaphragm disk made from flexible material and which is held with a central region in a bore of a valve housing and is prestressed with a radially outer edge against a valve seat on the valve housing, so as to lift up from the valve seat in a pressure-induced manner in the case of a pressure gradient between an inlet space and an outlet space or atmosphere and to open a flow cross section between the inlet space and the outlet space or atmosphere; and a plurality of hold-downs, as viewed in the circumferential direction of the diaphragm disk, arranged at a circumferential spacing from one another and hold down the radially outer edge of the diaphragm disk locally against the valve seat are provided on the valve housing.

2. The ventilation/check valve of claim 1, wherein the hold-downs are arranged on a cover of the valve housing, which cover covers the bore of the valve housing with the at least one diaphragm disk.

3. The ventilation/check valve of claim 2, wherein the diaphragm disk is held on a journal which is held centrally in the bore of the valve housing and protrudes into a bore of the cover.

4. The ventilation/check valve of claim 1, wherein mandrel-shaped stops for the diaphragm disk are configured on end faces of the hold-downs which face the diaphragm disk.

5. The ventilation/check valve of claim 1, wherein the hold-downs press the radially outer region of the diaphragm disk locally against the valve seat.

6. A ventilation/check valve for a ventilation or outlet opening of a compressed air apparatus of a vehicle, comprising:

at least one diaphragm disk made from flexible material and which is held with a central region in a bore of a valve housing and is prestressed with a radially outer region against a valve seat on the valve housing, so as to lift up from the valve seat in a pressure-induced manner in the case of a pressure gradient between an inlet space and an outlet space or atmosphere and to open a flow cross section between the inlet space and the outlet space or atmosphere; and a plurality of hold-downs, as viewed in the circumferential direction of the diaphragm disk, arranged at a circumferential spacing from one another and hold down the radially outer region of the diaphragm disk locally against the valve seat are provided on the valve housing;

wherein the hold-downs are arranged on a cover of the valve housing, which cover covers the bore of the valve housing with the at least one diaphragm disk; and wherein, as viewed in the circumferential direction of the cover, ventilation openings are provided in the cover at the circumferential positions of the hold-downs.

7. The ventilation/check valve of claim 6, wherein, as viewed in the radial direction of the cover, wall sections of arcuate cross section of the cover are arranged between the ventilation openings and the hold-downs, which wall sections, as viewed in the circumferential direction of the cover, are arranged at positions of the hold-downs and extend axially away from the cover in relation to a center axis of the cover.

8. The ventilation/check valve of claim 7, wherein the wall sections of the cover protrude beyond the valve seat on the valve housing as viewed in a direction parallel to the center axis of the cover.

9. The ventilation/check valve of claim 6, wherein an arc length of the wall sections of the arcuate cross section is greater than a circumferential extent of the ventilation openings.

10. The ventilation/check valve of claim 6, wherein, as viewed in the circumferential direction of the cover, flow openings are arranged between the wall sections of the arcuate cross section, which flow openings open into a radially outer annular duct of the cover, which annular duct communicates with the ventilation openings.

11. A ventilation/check valve for a ventilation or outlet opening of a compressed air apparatus of a vehicle, comprising:

at least one diaphragm disk made from flexible material and which is held with a central region in a bore of a valve housing and is prestressed with a radially outer edge against a valve seat on the valve housing, so as to lift up from the valve seat in a pressure-induced manner in the case of a pressure gradient between an inlet space and an outlet space or atmosphere and to open a flow cross section between the inlet space and the outlet space or atmosphere; and a plurality of hold-downs, as viewed in the circumferential direction of the diaphragm disk, arranged at a circumferential spacing from one another and hold down the radially outer edge of the diaphragm disk locally against the valve seat are provided on the valve housing;

wherein the valve seat is configured as a circumferential sealing blade on a bore edge of the bore.

12. A compressed air apparatus of a vehicle, comprising:

at least one ventilation/check valve in a ventilation or outlet opening;

wherein the at least one ventilation/check valve includes:

at least one diaphragm disk made from flexible material and which is held with a central region in a bore of a valve housing and is prestressed with a radially outer edge against a valve seat on the valve housing, so as to lift up from the valve seat in a pressure-induced manner in the case of a pressure gradient between an inlet space and an outlet space or atmosphere and to open a flow cross section between the inlet space and the outlet space or atmosphere; and a plurality of hold-downs, as viewed in the circumferential direction of the diaphragm disk, arranged at a circumferential spacing from one another and hold down the radially outer edge of the diaphragm disk locally against the valve seat are provided on the valve housing.

13. A compressed air apparatus of a vehicle, comprising:

at least one electropneumatic or pneumatic valve with at least one ventilation opening, in which a ventilation/check valve is arranged;

wherein the at least one ventilation/check valve includes:

at least one diaphragm disk made from flexible material and which is held with a central region in a bore of a valve housing and is prestressed with a radially outer edge against a valve seat on the valve housing, so as to lift up from the valve seat in a pressure-induced manner in the case of a pressure gradient between an inlet space and an outlet space or atmosphere and to open a flow cross section between the inlet space and the outlet space or atmosphere; and a plurality of hold-downs, as viewed in the circumferential direction of the diaphragm disk, arranged at a circumferential spacing from one another and hold down the radially outer edge of the diaphragm disk locally against the valve seat are provided on the valve housing.

14. A compressed air apparatus of a vehicle, comprising:
at least one electropneumatic or pneumatic valve with at least one ventilation opening, in which a ventilation/check valve is arranged;
wherein the at least one ventilation/check valve includes:
at least one diaphragm disk made from flexible material and which is held with a central region in a bore of a valve housing and is prestressed with a radially outer region against a valve seat on the valve housing, so as to lift up from the valve seat in a pressure-induced manner in the case of a pressure gradient between an inlet space and an outlet space or atmosphere and to open a flow cross section between the inlet space and the outlet space or atmosphere; and
a plurality of hold-downs, as viewed in the circumferential direction of the diaphragm disk, arranged at a circumferential spacing from one another and hold down the radially outer region of the diaphragm disk locally against the valve seat are provided on the valve housing;
wherein the electropneumatic valve is an ABS valve or an ASR valve of a brake slip-controlled and/or drive slip-controlled brake system of the vehicle.

* * * * *